US007993190B2

(12) United States Patent
Gosztyla et al.

(10) Patent No.: US 7,993,190 B2
(45) Date of Patent: Aug. 9, 2011

(54) SYSTEM AND METHOD FOR TOUCH DRIVEN COMBAT SYSTEM

(75) Inventors: Jeffrey Gosztyla, Salt Lake City, UT (US); Jason Ablett, Salt Lake City, UT (US); Richard Ablett, legal representative, Salt Lake City, UT (US); Devon Hargraves, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 395 days.

(21) Appl. No.: 11/952,902

(22) Filed: Dec. 7, 2007

(65) Prior Publication Data

US 2009/0149232 A1 Jun. 11, 2009

(51) Int. Cl.
*A63F 13/00* (2006.01)
*A63F 13/06* (2006.01)
*A63F 9/24* (2006.01)
*A63F 13/10* (2006.01)
*G06F 17/00* (2006.01)

(52) U.S. Cl. .................. 463/7; 463/30; 463/31; 463/34; 463/37; 273/317.1; 273/461; 345/24; 345/473; 345/636; 345/950

(58) Field of Classification Search .................. 463/1–5, 463/7–9, 30–34, 36–39, 40–43, 49–57; 273/108.1, 273/127 R, 148 R, 148 B, 309, 317.1, 340, 273/343, 348, 361–367, 461; 345/1.1–1.3, 345/2.1–2.3, 3.1–3.4, 24, 419, 467–469, 345/473, 539, 543–544, 625, 636, 638, 653–656, 345/664–666, 682–683, 686, 949–950, FOR. 139, 345/FOR. 153; 348/14.15, 39, 42, 47–52, 348/115, 117, 121, 135–137, 141, 211.2, 348/211.4, 211.7–211.8, 211.14, 211.99, 348/576, 588–589, 719, 721, 734, E13.004, 348/E13.064–E13.067; 375/240.15–240.16, 375/240.25; 434/37–38, 43–44, 69, 118, 434/240, 256–257
See application file for complete search history.

(56) References Cited

U.S. PATENT DOCUMENTS

| 5,603,507 | A | * | 2/1997 | Tice ................................ 473/29 |
| 6,155,923 | A | * | 12/2000 | Stephens et al. .................. 463/1 |
| 6,196,917 | B1 | * | 3/2001 | Mathias et al. ................... 463/2 |
| 6,227,974 | B1 | * | 5/2001 | Eilat et al. ........................ 463/40 |
| 6,609,976 | B1 | * | 8/2003 | Yamagishi et al. ............. 463/31 |

(Continued)

*Primary Examiner* — Arthur O. Hall
(74) *Attorney, Agent, or Firm* — Pillsbury Winthrop Shaw Pittman LLP

(57) ABSTRACT

An interactive computerized game system including a visual display, one or more user input devices, and a processor executing software that interacts with the display and input device(s) is disclosed. The software displays images avatars. At least one of the user input devices is a touchscreen. During gameplay, the gameplayer may select at least one avatar using the touchscreen and initiate a skill-based action sub-game. The gameplayer may provide additional input using the touchscreen. An animation is displayed in response to user input satisfying an objective of the sub-game.

27 Claims, 7 Drawing Sheets

U.S. PATENT DOCUMENTS

| | | | |
|---|---|---|---|
| 6,652,378 B2* | 11/2003 | Cannon et al. | 463/20 |
| 7,445,549 B1* | 11/2008 | Best | 463/32 |
| 7,682,250 B2* | 3/2010 | Ikebata et al. | 463/31 |
| 7,771,279 B2* | 8/2010 | Miyamoto et al. | 463/31 |
| 7,843,455 B2* | 11/2010 | Bridger et al. | 345/473 |
| 7,874,908 B2* | 1/2011 | Walker et al. | 463/20 |
| 7,883,403 B2* | 2/2011 | Low et al. | 463/16 |
| 2005/0206610 A1* | 9/2005 | Cordelli | 345/156 |
| 2006/0068917 A1* | 3/2006 | Snoddy et al. | 463/42 |
| 2007/0039334 A1* | 2/2007 | Hong | 62/129 |
| 2007/0260984 A1* | 11/2007 | Marks et al. | 715/706 |
| 2008/0076555 A1* | 3/2008 | Silver et al. | 463/31 |
| 2008/0215974 A1* | 9/2008 | Harrison et al. | 715/706 |
| 2010/0137047 A1* | 6/2010 | Englman et al. | 463/6 |
| 2010/0248818 A1* | 9/2010 | Aoki et al. | 463/25 |

* cited by examiner

SYSTEM AND METHOD FOR TOUCH DRIVEN COMBAT SYSTEM

BACKGROUND OF THE INVENTION

1. Field of the Invention

This application generally relates to interactive computerized game systems.

2. Description of the Related Technology

In existing role-playing games, the gameplayer activates buttons or keys on a game controller to control the actions of an avatar displayed onscreen. Many games involve a touchscreen which the gameplayer interacts with in order to control the movement of an avatar displayed onscreen, or to navigate user interface menus.

SUMMARY OF THE INVENTION

In one embodiment, the invention comprises a method comprising displaying a plurality of avatars in a game, displaying a skill-based action sub-game having at least one objective in response to a user input from a touchscreen selecting at least one avatar, receiving in response to displaying the sub-game, a plurality of user input from the touch screen, and displaying an animation in response to the user input satisfying an objective of the sub-game.

In another embodiment, the invention comprises a system comprising a visual display configured to display plurality of avatars, at least a portion of the visual display comprising a touch screen configured to receive user input in, and a processor executing software configured to display a plurality of avatars in a game, display a skill-based action sub-game having at least one objective in response to a user input from the touchscreen selecting at least one avatar, receive in response to displaying the sub-game, a plurality of user input from the touch screen, and display an animation in response to the user input satisfying an objective of the sub-game.

In another embodiment, the invention comprises a computer readable medium having computer executable instructions stored thereon which, when executed, cause a computing device to perform a method of simulating an attack, the method comprising displaying a plurality of avatars in a game, displaying a skill-based action sub-game having at least one objective in response to a user input from a touchscreen selecting at least one avatar, receiving in response to displaying the sub-game, a plurality of user input from the touch screen, and displaying an animation in response to the user input satisfying an objective of the sub-game.

In another embodiment, the invention comprises a system comprising means for receiving user input, means for displaying a plurality of avatars in a game, means for displaying a skill-based action sub-game having at least one objective in response to the user input selecting at least one avatar, and means for displaying an animation in response to the user input satisfying an objective of the sub-game.

DETAILED DESCRIPTION OF CERTAIN INVENTIVE EMBODIMENTS

Figure 1:
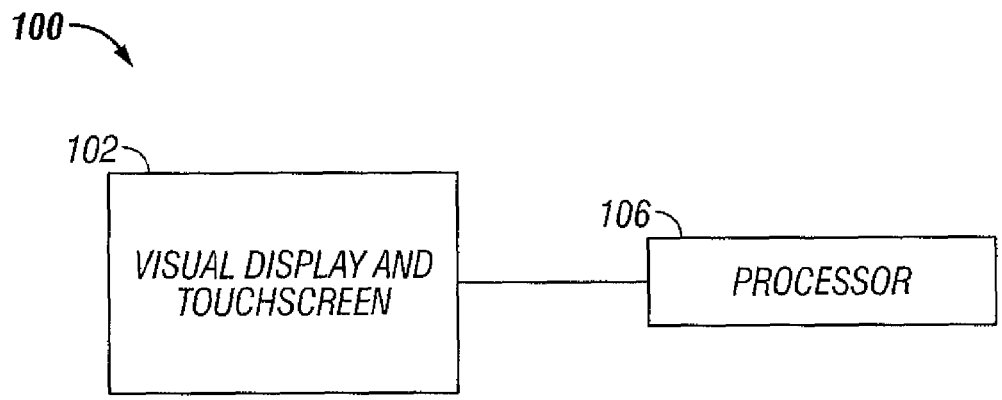
FIGS. 1-3 are block diagrams of game systems according to various embodiments.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The system is comprised of various modules, tools, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

Various embodiments of the invention provide a system and method of gameplay which is carried out using a touchscreen device to control the actions of an avatar displayed onscreen. Embodiments may help create an experience in which the actions of the avatar emulate the physical actions performed by the gameplayer.

Embodiments of the invention generally involve a visual display configured to display an image at least one avatar. As used in this description, the term "avatar" can refer to any character that is displayed onscreen. The character displayed may be a human character or may be a fantastical character including but not limited to monsters and trolls. In certain embodiments of the invention, an avatar may represent the gameplayer's on-screen in-game persona. In other embodiments, avatars may represent other in-game personas the gameplayer has no control over. In another embodiment, the gameplayer may control a plurality of avatars and these avatars may each represent a different in-game persona.

Additionally, embodiments of the invention involve a "sub-game." As used in this description, the term "sub-game" can refer to a series of interactions between the gameplayer and the game system. The gameplayer may use a touchscreen or other input device to provide input to the system. The sub-game may comprise objectives. The gameplayer may interact with the touchscreen to accomplish the objectives. A wide variety of objectives may be present in the sub-game. For example, a sub-game may have an objective requiring the gameplayer to draw a particular shape. Or a sub-game may have an objective requiring the gameplayer to hit targets on the screen. This specification in no way limits the types of sub-games that may be displayed. In addition, this specification in no way limits the types of objectives that may be present in the sub-game and in no way limits how the gameplayer interacts with the system.

The sub-game may be skill-based. By skill-based it is meant that the gameplayer will exercise a particular skill to complete objectives within the sub-game. For example, the objective of a sub-game may consist of activating an object on the touchscreen at the right time in order to cause the object to hit another moving object on the touchscreen. The skill the gameplayer exercises in this example would be timing, as the gameplayer would need to time the input provided to the touchscreen correctly in order to complete the objective. In another example, the gameplayer shoots a bow and arrow at targets displayed on the touchscreen. In this example, the skill the gameplayer exercises in this example is aim. The specification in no way limits the types of skills that may be involved in the sub-game.

The sub-game may be an action sub-game. By "action" it is meant that the sub-game may represent or indicate the animation displayed when an objective of the sub-game is completed. For example, in one sub-game, the gameplayer may use a bow and arrow to shoot at targets on the touchscreen. If the gameplayer completes an objective by hitting at least one target, a first avatar displayed on screen will attack a second avatar displayed on screen using a bow and arrow. In another example, the gameplayer may trace a pattern displayed on a symbol. If the gameplayer traces the pattern correctly, the first avatar may initiate an attack on the second avatar using magic.

With reference now to FIG. 1, a block diagram illustrates an exemplary system for playing a video game. Another platform for gameplay could be a television set with internal or external software application execution capability. The device 100 generally includes a visual display 102 connected to a processor 106. At least a portion of the visual display 102 is a touchscreen. The visual display 102 may be configured to display an image an avatar (described in detail above). The touchscreen portion of the visual display 102 may be configured to receive user input in response to the displayed image of an avatar. The touchscreen may, for example, be configured display a sub-game in response to the gameplayer's selection of a first avatar and a second avatar, and the gameplayer drawing a symbol on the touchscreen portion of the visual display. For example, the sub-game may comprise a series of targets that the gameplayer must hit. The processor 106 may execute software configured to display an animation in response to the user input received which satisfies an objective of the sub-game.

Figure 2:
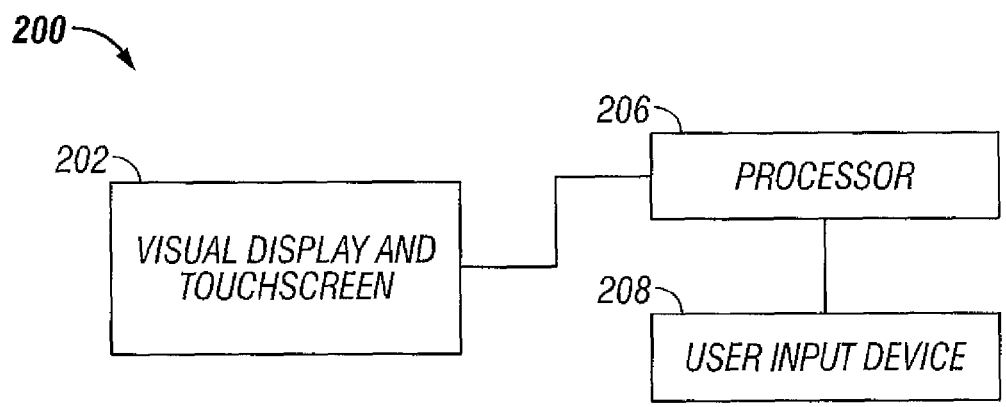

FIG. 2 illustrates an alternative embodiment, in which a device 200 includes a visual display 202, a processor 206, and at least one user input device 208. At least a portion of the visual display 202 is a touchscreen. The user input device 208 may comprise any device suitable for receiving user input, for example, a button or set of buttons, a keypad, or a directional pad ("D-pad"). In an embodiment including a D-pad input device, for example, each leg of the D-pad may be configured to control the movement of a particular avatar displayed on the visual display 202. For example, the upper leg of the D-pad may be configured to move an avatar in a forward direction on the visual display 202.

Figure 3:
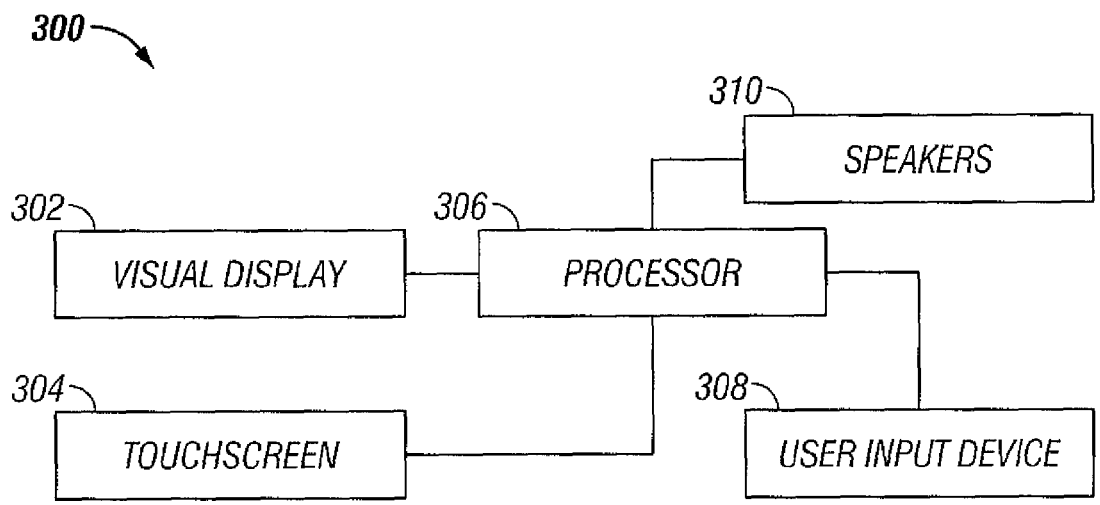

Embodiments of the invention may include a visual display having two or more visually separate portions. As illustrated in FIG. 3, a device 300 may include a visual display having a non-touchscreen portion 302 and a visually separate touchscreen portion 304. The device 300 may further include speakers 310.

In certain embodiments of the invention, the user input comprises input to a touchscreen. Touchscreen input can be achieved with a stylus, with an adapted stylus in the form of a pointing object, or with a finger. Herein, the specification will use the term "stylus" to refer to any object used to provide input to the touchscreen. The specification in no way limits the types of objects which may be used to provide input to the touchscreen.

Many game systems provide a controller pad to receive user input. A controller pad generally comprises a directional pad and a variety of buttons and keys. Some game systems provide a touchscreen which allows the user to use a stylus to provide input. In certain embodiments of the invention, the gameplayer further interacts with the game system by using the touchscreen after selecting the avatars. The gameplayer may play a sub-game in order to determine how successful one avatar is in attacking another. Or, the gameplayer may play a sub-game in order to determine how much damage an attack from one avatar is inflicted on a second avatar. The sub-game enhances the interactivity of the gameplay. The user interacts with the game system to provide input to the sub-game in order to accomplish objectives. These objectives further control how the avatar will interact with other avatars and provide a more interactive and in-depth gameplay then in the prior art.

Figure 4A:
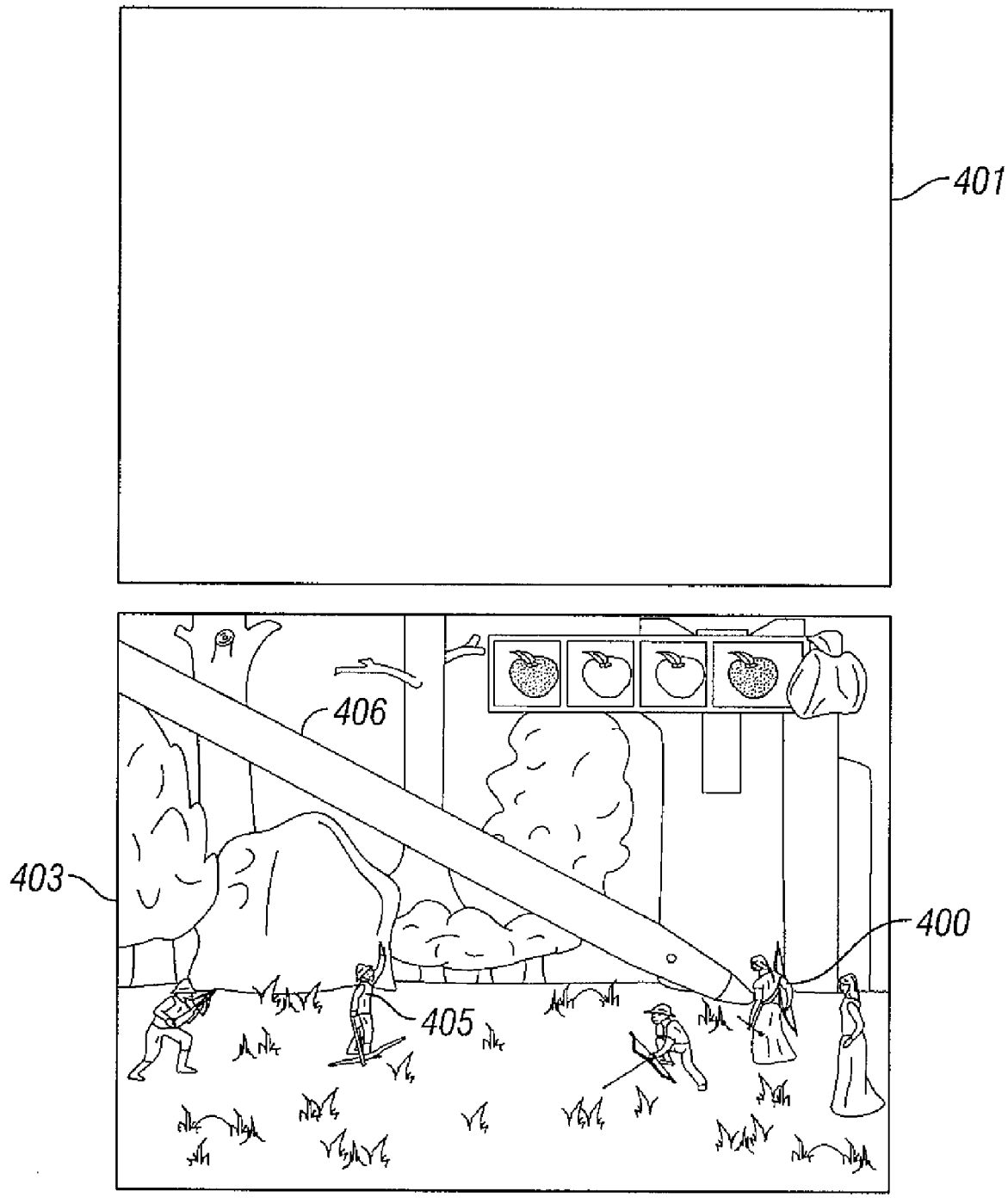
FIG. 4A is a diagram of the touchscreen of a game system according to a certain embodiment of the invention.

FIG. 4A illustrates an embodiment of the invention as used in a game designed for a portable game machine such as the Nintendo DS™. The visual display has a non-touchscreen portion 401 and a touchscreen portion 403. As can be seen in the figure, the touchscreen portion 403 displays an image of at least two avatars, a first avatar 400 and a second avatar 405. The stylus 406 used by the gameplayer is represented in the figure. The stylus 406 is not part of the image displayed on the touchscreen portion 401. Stylus 406 is shown in the figure to represent the selection of the first avatar 400.

Figure 4B:
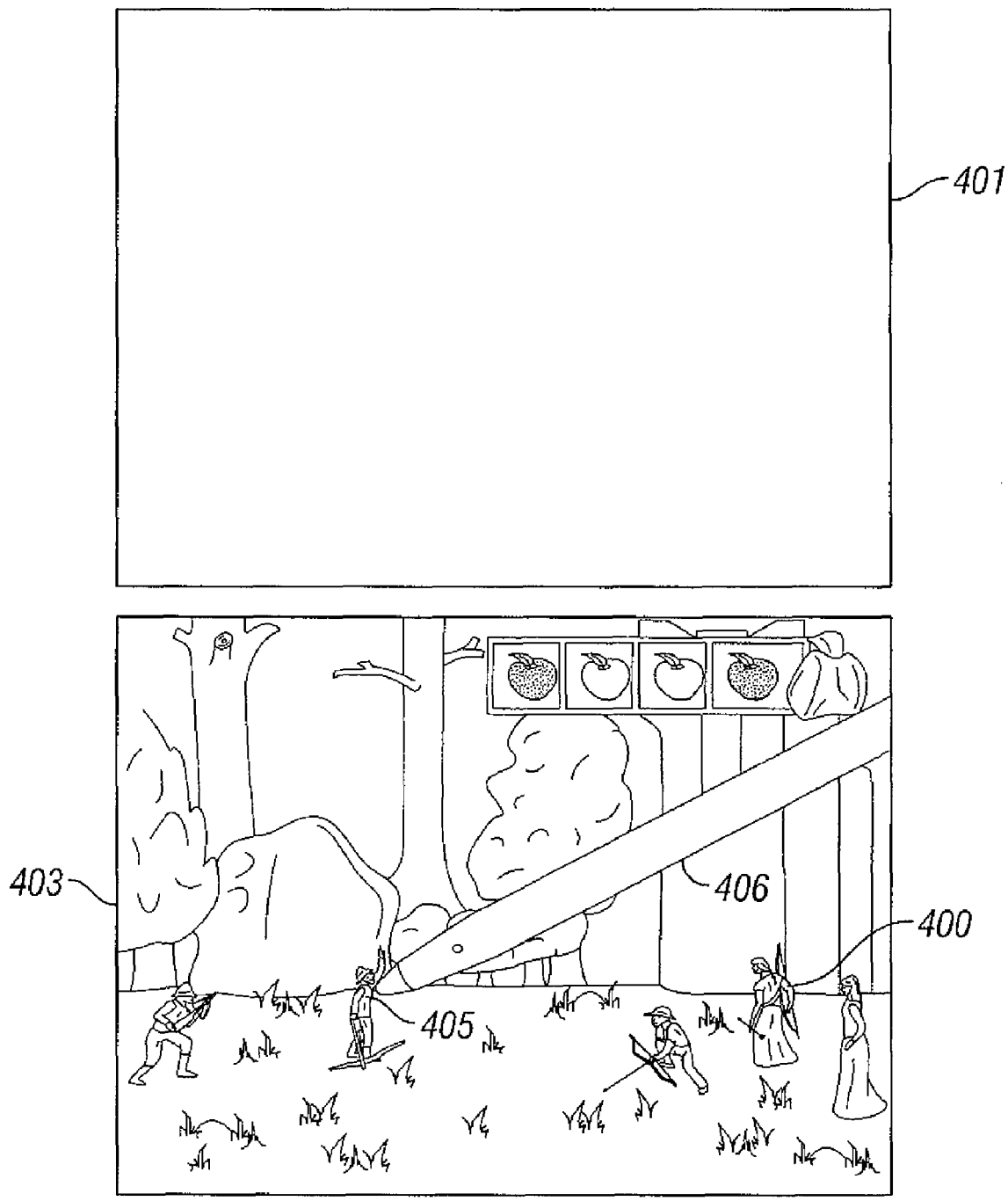
FIG. 4B is a diagram of the touchscreen of a game system according to an embodiment of the invention.

FIG. 4B further illustrates the embodiment shown in FIG. 4A as used in a game designed for a portable game machine such as the Nintendo DS™. The visual display has a non-touchscreen portion 401 and a touchscreen portion 403. As can be seen in the figure, the touchscreen portion 403 displays an image of at least two avatars, a first avatar 400 and a second avatar 405. The stylus 406 used by the gameplayer is represented in the figure. The stylus 406 is not part of the image displayed on the touchscreen portion 401. Stylus 406 is shown in the figure to represent the selection of the second avatar 400.

Figure 4C:
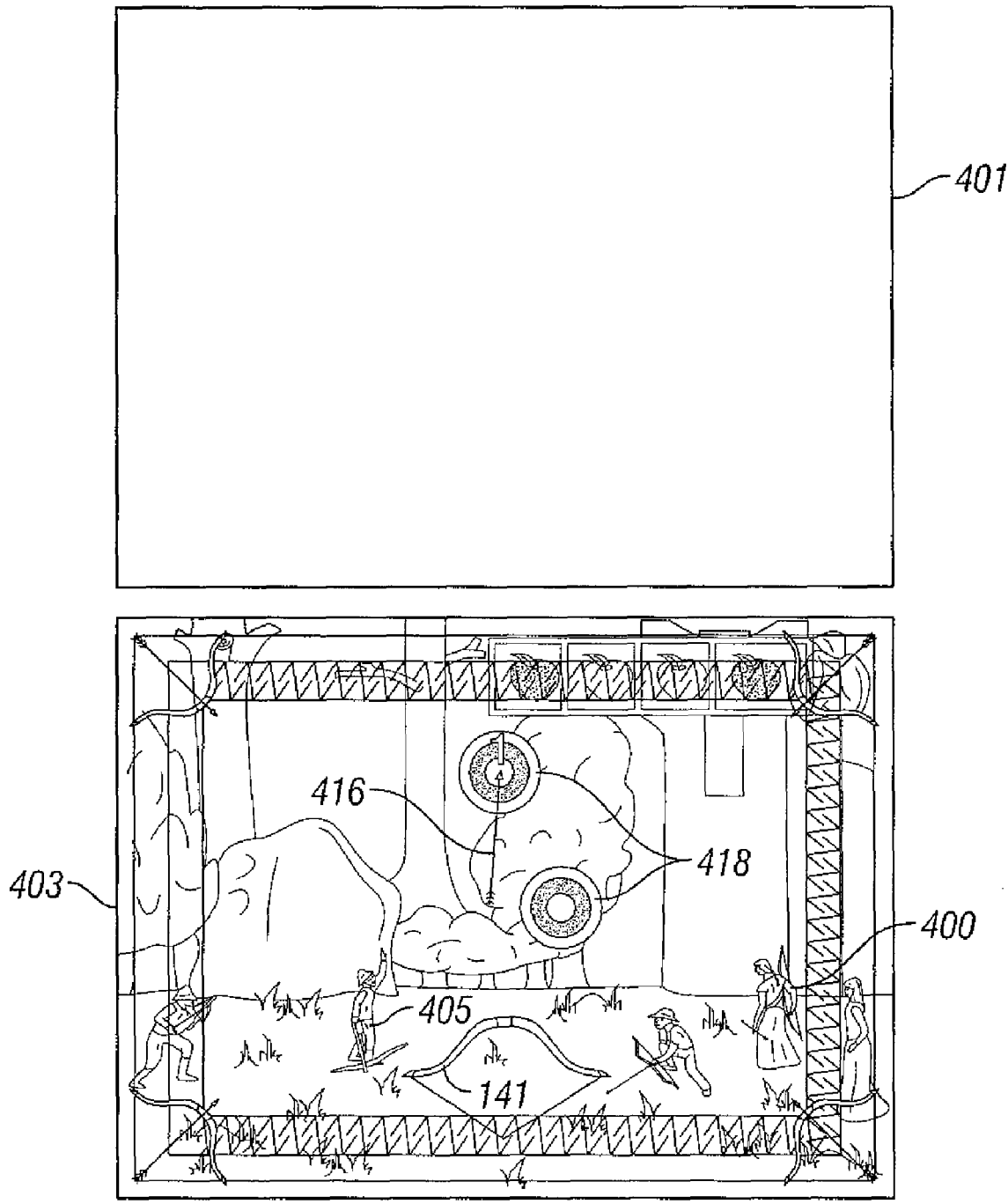
FIG. 4C is a diagram of the touchscreen of a game system according to another embodiment of the invention.

FIG. 4C further illustrates the embodiment shown in FIGS. 4A-4B as used in a game designed for a portable game machine such as the Nintendo DS™. The visual display has a non-touchscreen portion 401 and a touchscreen portion 403, and a first avatar 400 and a second avatar 405 are displayed on the touchscreen portion 403. Touchscreen portion 403 displays a sub-game that the gameplayer may interact with. In this embodiment, targets 418 a bow 414 and an arrow 416 are displayed on the touchscreen. The gameplayer interacts with the touchscreen portion 403 and directs the bow 414 to shoot an arrow 416 at the target 418. Hitting a target 418 with the bow 414 and arrow 416 corresponds to an objective of the sub-game. In this embodiment, the gameplayer may satisfy more then one objective of the sub-game by hitting multiple targets 418.

Figure 4D:
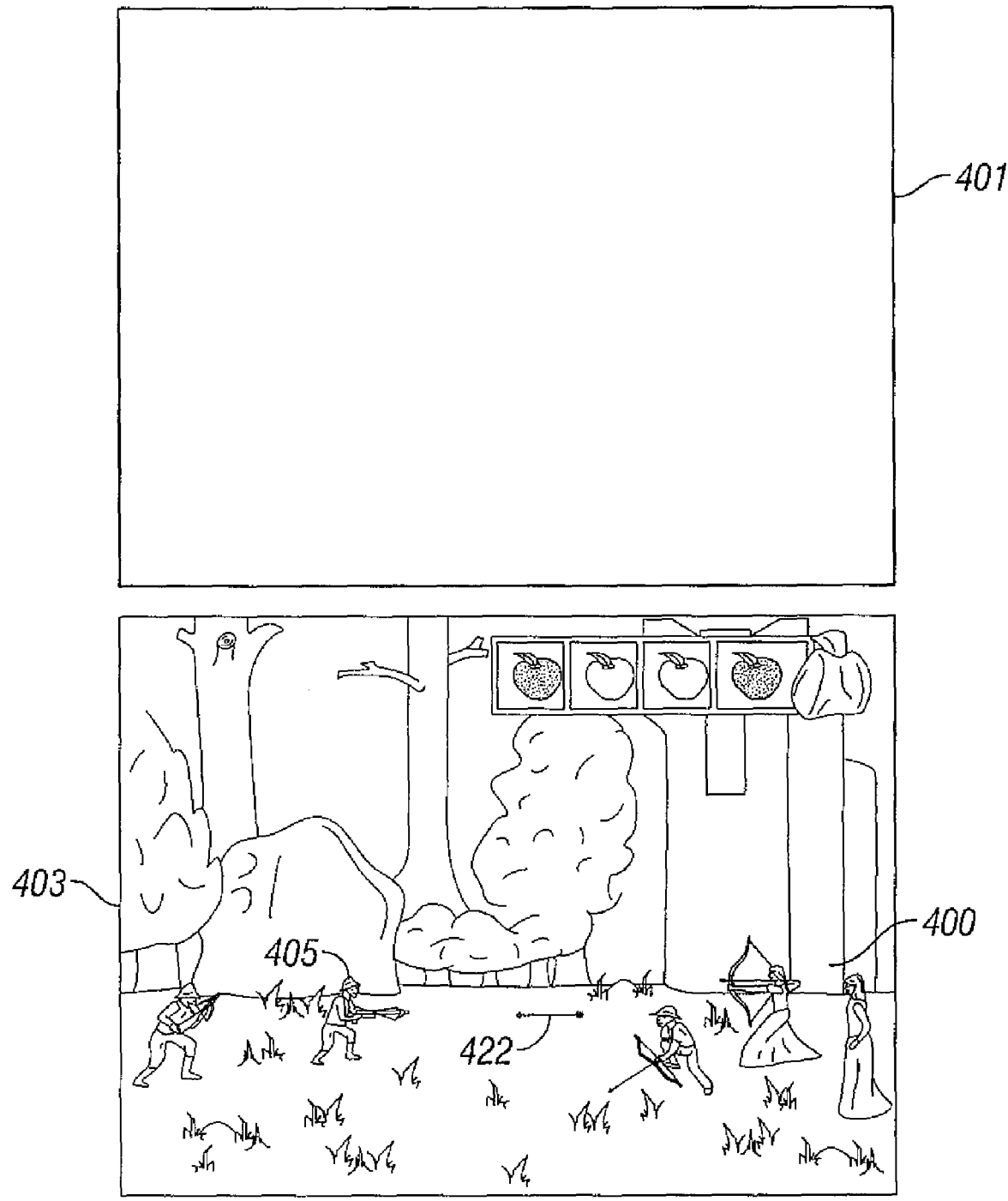
FIG. 4D is a diagram of the touchscreen of a game system according to another embodiment of the invention.

FIG. 4D further illustrates the embodiment shown in FIGS. 4A-4C as used in a game designed for a portable game machine such as the Nintendo DS™. The visual display has a non-touchscreen portion 401 and a touchscreen portion 403, and a first avatar 400 and a second avatar 405 are displayed on the touchscreen portion 403. Touchscreen portion 403 displays a sub-game that the gameplayer may interact with. In this embodiment, the sub-game as shown in FIG. 4D has been completed and at least one objective of the sub-game has been satisfied. The touchscreen portion 403 of the display shows an arrow 422 originating from avatar 400 and configured to strike avatar 405. In other embodiments, the amount of damage inflicted upon avatar 405 may be determined by the number of objectives in the sub-game satisfied by the gameplayer.

Figure 5A:
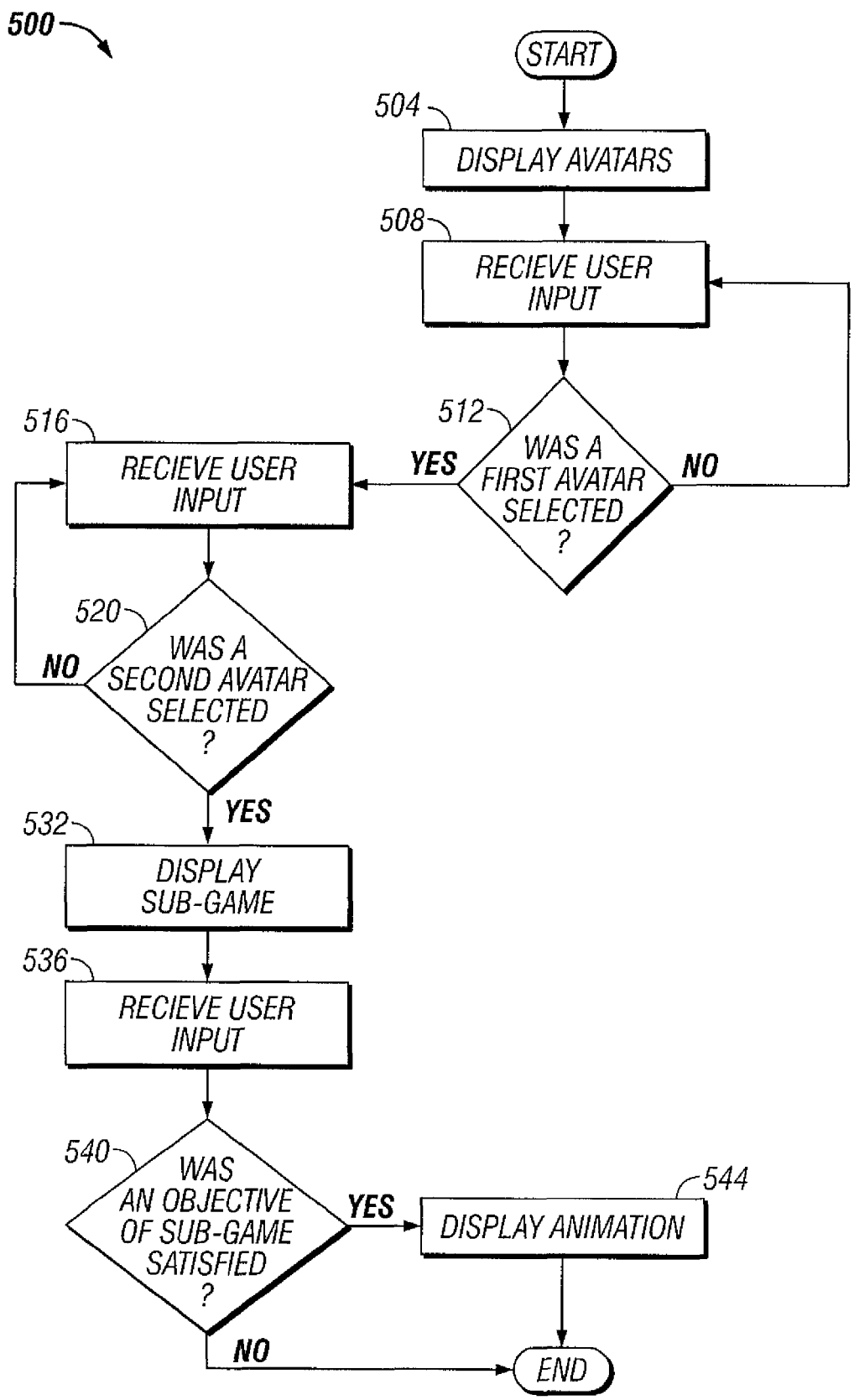
FIG. 5A is a flow diagram of an embodiment of a game process.

FIG. 5A illustrates a basic gameplay process 500 according to an embodiment of the invention. Starting at block 504, at least two avatars are displayed. Next, at block 508, user input is received. Then at block 512, the user input is evaluated to check for a selection of a first avatar. If a first avatar was selected, the process proceeds to block 516. FIG. 4A illustrates an embodiment wherein a first avatar 400 is selected. At block 516, user input is received. Next, at block 520, the user input is evaluated to check for a selection of a second avatar. If a second avatar was selected, the process proceeds to block 532. FIG. 4C illustrates an embodiment wherein a sub-game is displayed on the touchscreen. FIG. 4C additionally shows targets 418 which are objectives of the sub-game. After the sub-game is displayed at block 532, the process the moves to block 536. At block 536, user input is received. Next, at block 540, the user input is evaluated to determine if an objective of the sub-game has been satisfied. If an objective of the sub-game has been satisfied, the process proceeds to block 544 where an animation is displayed. The animation displayed may show the first avatar attacking the second avatar. FIG. 4D is an embodiment wherein an attack animation is displayed. FIG. 4D shows an embodiment wherein the first avatar 400 attacks the second avatar 405 using an arrow 422.

Figure 5B:
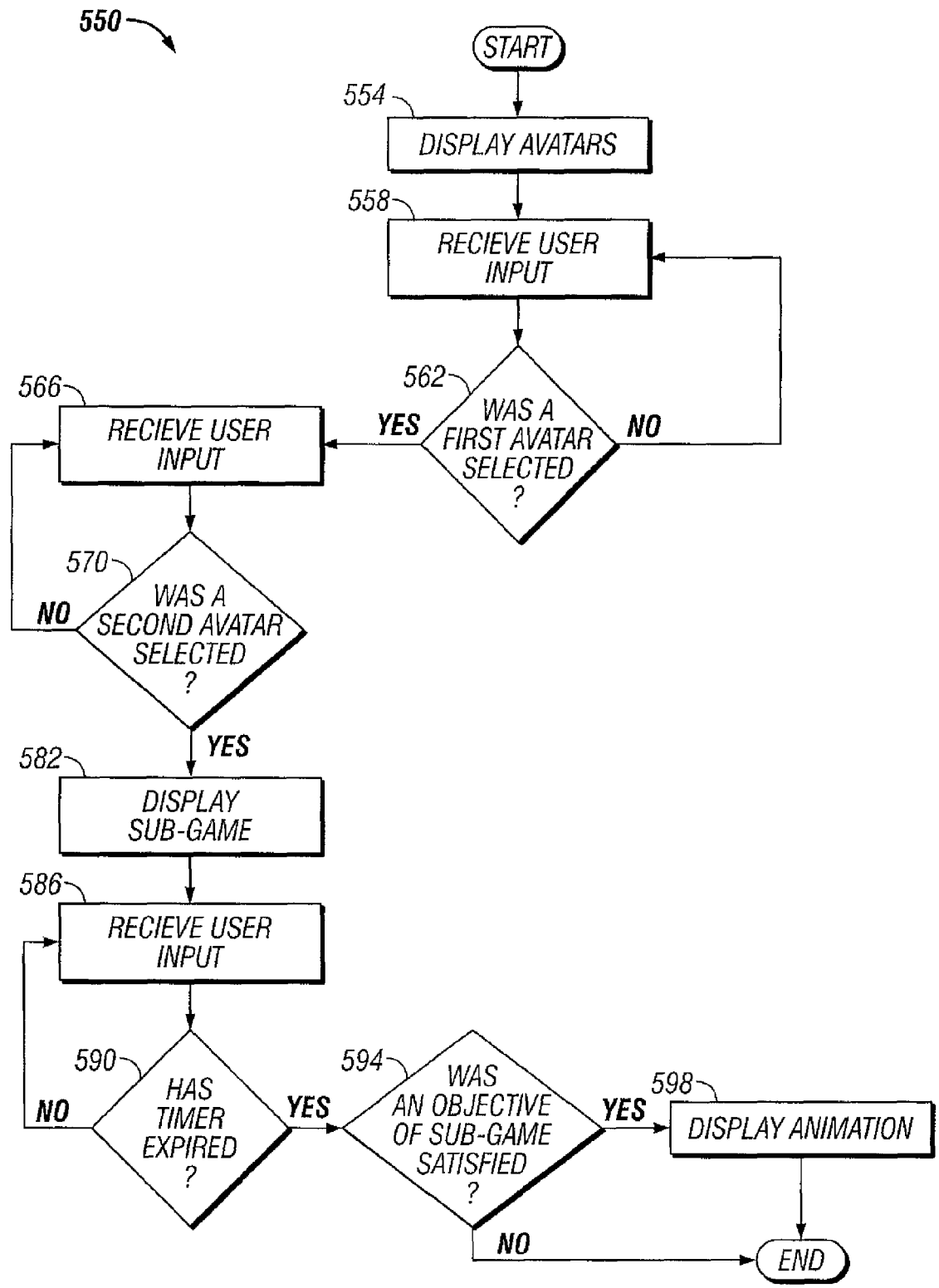
FIG. 5B is a flow diagram of another embodiment of a game process.

FIG. 5B illustrates a basic gameplay process 550 according to another embodiment of the invention. The process described in FIG. 5B is similar to the process in FIG. 5A, but differs such that a time limit is imposed on the user to interact with the touchscreen and provide user input. Starting at block 554, at least two avatars are displayed. Next, at block 558, user input is received. Then, at block 562, the user input is evaluated to check for a selection of a first avatar. If a first avatar was selected, the process proceeds to block 566. FIG. 4A illustrates an embodiment wherein a first avatar 400 is selected. At block 566, user input is received. Then, at block 570, the user input is evaluated to check for a selection of a second avatar. If a second avatar was selected, the process proceeds to block 582. FIG. 4C illustrates an embodiment wherein a sub-game is displayed on the touchscreen. FIG. 4C additionally shows targets 418 which are objectives of the sub-game. After the sub-game is displayed at block 582, the process the moves to block 586. At block 586, user input is received. Next, at block 590, a timer is evaluated to determine the amount of time remaining on the timer. If the timer has not expired, the process proceeds to block 586 to receive more user input. If the timer has expired, the process proceeds to block 594. At block 594, the user input is evaluated to determine whether an objective of the sub-game has been satisfied. If an objective of the sub-game has been satisfied, the process proceeds to block 598 where an animation is displayed. The animation displayed may show the first avatar attacking the second avatar. FIG. 4D is an embodiment wherein an attack animation is displayed. FIG. 4D shows an embodiment wherein the first avatar 400 attacks the second avatar 405 using an arrow 422.

It will be understood that numerous and various modifications can be made from those previously described embodiments and that the forms of the invention described herein are illustrative only and are not intended to limit the scope of the invention.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method comprising:
    displaying, on a touchscreen using a processor, a game including a plurality of avatars at a respective plurality of locations, the avatars being anthropomorphic characters;
    receiving a first user input from the touchscreen indicating that the user has selected at least one of the plurality of locations at which an avatar is displayed, wherein at least one avatar is selected in response to the first user input;
    displaying, on the touchscreen using the processor, a skill-based action sub-game having at least one sub-game objective in response to the first user input;
    receiving, in response to displaying the sub-game, a second user input; and
    displaying, on the touchscreen using the processor, an animation in the game in response to the second user input satisfying at least one sub-game objective, wherein the second user input satisfying the at least one sub-game objective affects at least one attribute of at least one of the selected avatars of the game,
    wherein the game is associated with a first set of gameplay rules, the sub-game is associated with a second set of gameplay rules, and the first set of gameplay rules is different from the second set of gameplay rules.

2. The method of claim 1, wherein one objective of the sub-game comprises hitting a target displayed on a screen.

3. The method of claim 1, wherein the animation displayed shows a first avatar displayed at a first selected location attacking a second avatar displayed at a second selected location.

4. The method of claim 3, wherein an amount of damage inflicted on the second avatar by the first avatar is determined by a number of objectives completed in the sub-game.

5. The method of claim 1, wherein there is a time limit in which an input device accepts the user input received during the sub-game.

6. The method of claim 1, wherein displaying the sub-game comprises displaying the sub-game so that at least a portion of the game is not shown.

7. The method of claim 1, wherein displaying the sub-game comprises invoking a code portion associated with the software code of the sub-game.

8. The method of claim 1, wherein the code portion associated with the software code of the sub-game is separately compiled from at least one other code portion associated with the software code of the game.

9. A system comprising:
- a visual display configured to display a game, at least a portion of the visual display comprising a touchscreen configured to receive user input; and
- a processor executing software configured to:
- display a plurality of avatars in the game at a respective plurality of locations, the avatars being anthropomorphic characters;
- receive a first user input from the touchscreen indicating that the user has selected at least one of the plurality of locations at which an avatar is displayed-wherein at least one avatar is selected in response to the first user input;
- display a skill-based action sub-game having at least one sub-game objective in response to the first user input;
- receive, in response to displaying the sub-game, a second user input; and
- display an animation in the game in response to the second user input satisfying at least one sub-game objective, wherein the second user input satisfying the at least one sub-game objective affects at least one attribute of at least one of the selected avatars of the game,
- wherein the game is associated with a first set of gameplay rules, the sub-game is associated with a second set of gameplay rules, and the first set of gameplay rules is different from the second set of gameplay rules.

10. The system of claim 9, wherein one objective of the sub-game comprises hitting a target displayed on a screen.

11. The system of claim 9, wherein the animation displayed shows a first avatar displayed at a first selected location attacking a second avatar displayed at a second selected location.

12. The system of claim 11, wherein an amount of damage inflicted on the second avatar by the first avatar is determined by a number of objectives completed in the sub-game.

13. The system of claim 9, wherein there is a time limit in which an input device accepts the second user input received during the sub-game.

14. The system of claim 9, wherein the visual display comprises a plurality of visually separate portions.

15. The system of claim 9, wherein the user input comprises tapping the touchscreen.

16. The system of claim 9, wherein the user input comprises dragging a stylus across a portion of the touchscreen.

17. A non-transitory computer readable storage medium having computer executable instructions stored thereon which, when executed, cause a computing device to perform a method of simulating an attack including the steps comprising:

- displaying a game including a plurality of avatars at a respective plurality of locations, the avatars being anthropomorphic characters;
- receiving a first user input from the touchscreen indicating that the user has selected at least one of the plurality of locations, the avatars being anthropomorphic characters at which an avatar is displayed, wherein at least one avatar is selected in response to the first user input;
- displaying a skill-based action sub-game having at least one sub-game objective in response to the first user input;
- receiving in response to displaying the sub-game, a second user input from the touch screen; and
- displaying an animation in the game in response to the second user input satisfying at least one sub-game objective, wherein the second user input satisfying the at least one sub-game objective affects at least one attribute of at least one of the selected avatars of the game,
- wherein the game is associated with a first set of gameplay rules, the sub-game is associated with a second set of gameplay rules, and the first set of gameplay rules is different from the second set of gameplay rules.

18. The non-transitory computer readable storage medium of claim 17, wherein one objective of the sub-game comprises hitting a target displayed on a screen.

19. The non-transitory computer readable storage medium of claim 17, wherein the animation displayed shows a first avatar displayed at a first selected location attacking a second avatar displayed at a second selected location.

20. The non-transitory computer readable storage medium of claim 19, wherein an amount of damage inflicted on the second avatar by the first avatar is determined by a number of objectives completed in the sub-game.

21. The non-transitory computer readable storage medium of claim 17, wherein there is a time limit in which an input device accepts the second user input received during the sub-game.

22. A system comprising:
- means for displaying a game including a plurality of avatars at a respective plurality of locations, the avatars being anthropomorphic characters;
- means for receiving a first user input indicating that the user has selected at least one of the plurality of locations at which an avatar is displayed, wherein at least one avatar is selected in response to the first user input;
- means for displaying a skill-based action sub-game having at least one sub-game objective in response to the first user input;
- means for receiving, in response to displaying the sub-game, a second user input; and
- means for displaying an animation in the game in response to the second user input satisfying at least one sub-game objective, wherein the second user input satisfying the at least one sub-game objective affects at least one attribute of at least one of the selected avatars of the game,
- wherein the game is associated with a first set of gameplay rules, the sub-game is associated with a second set of gameplay rules, and the first set of gameplay rules is different from the second set of gameplay rules.

23. The system of claim 22, wherein the at least one objective of the sub-game comprises hitting a target displayed on a screen.

24. The system of claim 22, wherein the animation displayed shows a first avatar displayed at a first location attacking a second avatar displayed at a second location.

25. The system of claim 24, wherein an amount of damage inflicted on the second avatar by the first avatar is determined by a number of objectives completed in the sub-game.

26. The system of claim 22, wherein the means for receiving user input comprises a touchscreen.

27. The system of claim 22, wherein there is a time limit in which the means for receiving the second user input accepts the user input received during the sub-game.

* * * * *